Feb. 10, 1959   J. F. MOSER, JR   2,873,145
CIRCULATING FINELY DIVIDED SOLIDS
Filed June 11, 1956
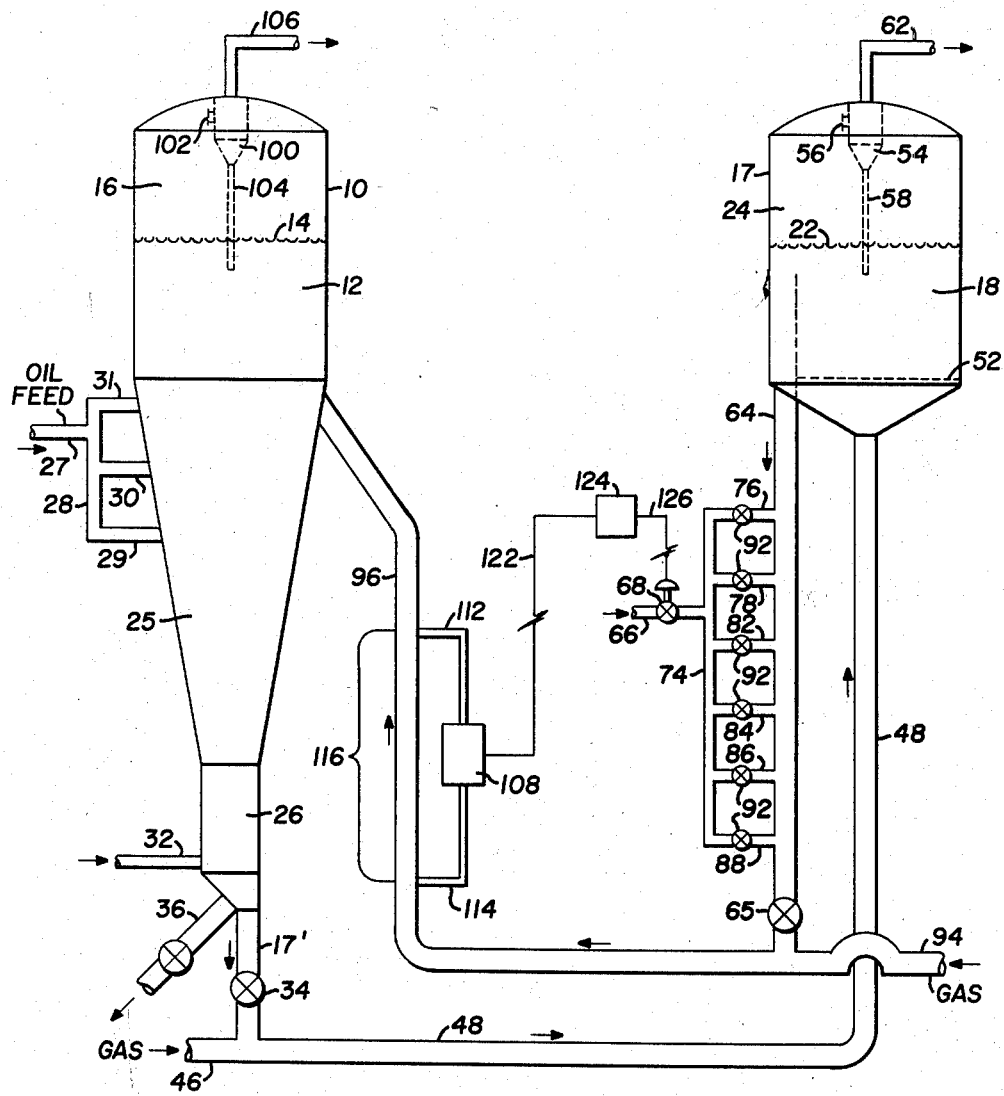
John F. Moser, Jr.   Inventor
By George J. Silhavy   Attorney

United States Patent Office 2,873,145
Patented Feb. 10, 1959

2,873,145

CIRCULATING FINELY DIVIDED SOLIDS

John Frederick Moser, Jr., Baton Rouge, La., assignor to Esso Research and Engineering Company, a corporation of Delaware Application June 11, 1956, Serial No. 590,700

4 Claims. (Cl. 302—53)

This invention relates to the circulation of finely divided solids between vessels by means of standpipes and risers. More particularly the invention relates to controlling the aeration gas input into a standpipe in response to the rate of flow of solids in the riser associated with the standpipe. The pressure drop across a section of the riser is substantially proportional to the actual solids rate when the gas velocity in the riser is maintained substantially constant.

In processes where finely divided or powdered materials such as catalysts or contact agents are circulated between contacting or reaction vessels by means of standpipes and risers, it is necessary to maintain proper aeration of the solids in the standpipe and this is done by injecting aerating or fluidizing gas at numerous points along the length of the standpipe. In order to obtain proper operation of a standpipe, it is necessary to inject or introduce fluidizing or aerating gas at spaced points along the standpipe to compensate for the compression of the gas in the standpipe due to the pressure buildup as the fluidized solids move downwardly in the standpipe. This is particularly true when dealing with coarse solids, i. e. 250 micron average particle size. The best standpipe operation is obtained when the amount of added fluidizing gas is very close to the amount required to just compensate for the compression of the gas in the fluidized mixture as it passes down the standpipe.

The present invention is especially adapted for use with rather long standpipes where rather high pressure buildup is obtained. The aerating gas is introduced under pressure into a manifold which leads to taps or aeration lines each provided with a fixed restriction or limiting orifice. The pressure is the least at the top of the standpipe and is the most at the bottom of the standpipe. The restriction orifices along the length of the standpipe and including the top and bottom orifices are all of the same size so that equal amounts of aerating gas are introduced at each of the restriction orifices to compensate for the compression of the gas. For a given system, the amount of aerating gas required at each aerating line or top is directly proportional to the solids circulation rate.

Once the system or process is in operation and the operation remains substantially constant, no changes or adjustments are necessary. But if it is necessary to vary or change the solids circulation rate to control temperature, solids to reagent or oil ratio or some other process variable, the rate of introduction of aeration gas to the aerating lines must be changed in order to obtain best standpipe performance.

The rate of aeration gas addition is directly proportional to the pressure of the aerating gas on the upstream side of the orifice. It is desirable to control the aerating gas pressure in direct proportion to the rate of solid circulation in the system. This is readily and easily done by using a static head or riser density meter on the riser which the standpipe feeds. The pressure drop on this meter is very nearly proportional to the actual solids circulation rate so that when, as is the usual case, the superficial gas velocity in the riser is kept substantially constant, the pressure drop across a relatively small section of the riser fed by the standpipe is substantially proportional to the actual solids circulation rate and this pressure drop can be used to control the pressure on the aeration gas in direct proportion to the solids circulation rate by standard instrumentation.

The riser density meter used for measuring the pressure drop across a section of the riser is operatively connected with the valve which is used for controlling flow of gas from a main source of supply for controlling introduction of aerating gas into the manifold for feeding the aeration lines or taps of the standpipe. This operative connection may be actuated by electrical, hydraulic or pneumatic means as is well known in the art. As the circulation rate of solids changes for any reason, the pressure drop in the riser will change and this change will be reflected in the change in the amount of aerating gas introduced into the aeration lines or taps from the main aeration gas supply. The meter for measuring pressure drop in the riser actuates means to operate the valve on the main aeration gas supply and automatically controls the operation.

Where more than one standpipe is used in a process, the present invention may be applied to each standpipe and its associated riser, if desired; however, in many cases where two standpipes are used one is much longer than the other, and the present invention is applied only to the longer standpipe. The present invention is applicable for use in catalytic cracking, hydroforming, fluid coking and any other fluidized solids operation requiring the use of a standpipe and riser for circulating finely divided solids or catalysts. The invention will be specifically described in connection with fluid coking but the invention is not to be restricted thereto because the invention can easily be adapted to other processes by those skilled in the art without the exercise of invention.

In the drawing the figure diagrammatically represents one form of apparatus adapted for practicing the present invention.

Referring now to the drawing, the reference character 10 designates a vertically arranged elongated cylindrical vessel or reactor containing a fluidized bed 12 of finely divided solid inert particles. The fluidized bed has a level indicated at 14 with a dilute phase or suspension 16 thereabove. A separate vertically arranged cylindrical burner or reheater vessel aranged at appoximately the same level as the first-mentioned vessel 10 is designated by the reference numeral 17. The vessels 10 and 17 need not be at the same elevation. The burner or reheater vessel 17 is much shorter in height than reactor vessel 10. The reactor 10 has only a relatively short standpipe 17′ associated with it. The burner or reheater vessel contains a dense fluidized turbulent bed 18 of finely divided solid particles having a level indicated at 22 and a dilute phase or suspension thereabove indicated at 24. The hydrocarbon vapors either alone or in admixture with steam pass upwardly through the fluidized bed 12 in the reactor 10 at a superficial velocity between about 1.0 and 4.0 feet per second to maintain the solid particles as a dense turbulent fluidized bed. The particles undergoing burning or reheating in the burner vessel 17 are maintained in a dense fluidized turbulent condition by air which passes upwardly through the fluidized bed 18 at a superficial velocity between about 1.0 and 4.0 feet per second.

Reaction vessel 10 has a conical section 25 which is smaller at its lower end than its upper end. The lower cylindrical section 26 extends down from the lower end of the conical section 25 and forms a stripping section later to be described in greater detail. Residual oil is preferably introduced through line 27 into a manifold 28 feeding lines 29, 30 and 31 which are arranged one above the other so that line 31 is the highest but is still below level 14 of the fluidized bed in the reactor 10. The oil feed is introduced into an intermediate portion of fluid bed 12 in reactor 10. Preferably the residual oil is preheated in any suitable manner.

The solid particles employed for fluid coking may be any inert material such as sand, pumice, etc., but preferably coke particles produced in the process.

The fluid coke comprises a range of particle sizes including those within about 50 to 1000 microns in diameter with most of the particles being between about 100 and 250 microns in diameter.

The feedstock for fluid coking may be a vacuum residuum, coal tar, asphalt, heavy distillate, topped crude, whole crude or other heavy fractions. The temperature during the coking in the reactor 10 may be within the range of about 800° to 1100° F., preferably between about 900° and 1000° F. The temperature during reheating in the burner vessel 17 may be between about 900° and 1200° F. and preferably between about 1050° and 1150° F. The solids to oil ratio required to maintain a heat balanced operation will vary with the characteristics of the feedstock but generally will be between about 5 to 1 to 30 to 1 parts by weight. The weight of oil per hour per weight of solids in the reactor 10 may vary between about 0.1 to 1 and 2.0 to 1.

When using fluid coke particles, the density of the fluidized bed 12 in reactor 10 and of the fluidized bed 18 in burner 17 will be between about 35 and 50 lbs. per cubic foot.

When using the apparatus for hydroforming, provision is made for the introduction of heated hydrogen, and preferably the naphtha feed is introduced directly into the lower portion of the fluidized bed in the reactor. Also the hydroforming process is carried out under a superatmospheric pressure between about 50 and 800 lbs. per square inch. The catalyst for hydroforming may be an alumina base containing about 5 to 15% molybdenum oxide or it may be an alumina base containing 0.5 to 2% by weight of platinum together with a small amount of halogen such as chlorine.

In hydroforming, the temperature during hydroforming may be between about 850° and 950° F. and the temperature during regeneration may be between about 1000° and 1200° F.

When using the present invention for catalytic cracking, the finely divided catalyst solids are preferably cracking catalyst such as silica-alumina particles and the oil feed is a relatively heavy hydrocarbon oil such as gas oil, which is preferably mixed with the hot regenerated catalyst particles going to the fluidized bed 12 of solid catalyst particles in reactor 10. Preferably the suspension of gas oil and catalyst is introduced into the reactor through a grid similar to that shown at 52 in the generator 17. The temperature during cracking may be between about 850° and 1100° F. In this case the vessel 17 becomes a regenerator where coke is burned off the catalyst particles and the temperature during regeneration may be between about 900° and 1200° F. so that the catalyst particles are heated to above reaction temperature and returned to the reactor 10 to supply heat of cracking thereto. The catalyst may be acid activated bentonitic clays or synthetically prepared silica-alumina catalysts, silica-magnesia, silica-magnesia-alumina, etc. and, if desired, other components such as zirconia, boria or the like may be added to the cracking catalyst. The catalyst is preferably in finely divided form with an average particle size between about 20 and 80 microns and including sizes above and below this range.

During fluid coking, additional carbonaceous material is deposited on the coke particles and the coke particles are withdrawn from the dense fluidized bed 12 into the lower portion of the reactor vessel 10 and into the stripping section 26 into which stripping gas such as steam is introduced through one or more lines 32. The stripped finely divided coke particles are introduced into the standpipe 17' provided with a control vale 34 at its lower end. Fluidizing or aerating gas may be introduced into the standpipe 17' through one or more aerating lines or taps. In most cases more coke is produced in the process than is necessary to supply heat in the burner 17 and hence some of the coke is withdrawn from the process through line 36 or through an equivalent line on the burner.

The stripped coke leaving the bottom of the standpipe 17' is picked up by steam, air or other oxidizing gas introduced through line 46 to form a relatively dilute suspension which is passed through the transfer line 48 into the lower part of the burner vessel 17 below grid 52. Grid 52 is provided to distribute the solid particles and air across the area of the regeneration vessel 17. As above mentioned, the air passing upwardly through the burner vessel 17 maintains the solid particles as a dense turbulent fluidized mass or bed during reheating. The oxidizing gas passing up through bed 18 passes into dilute phase 24 and contains entrained solids and most of these entrained solids are removed by passing them into cyclone separator 54 having an inlet 56 and a dip leg 58 for returning separated solids to the dense fluidized bed 18. Hot combustion gases pass overhead through line 62.

The hot reheated coke particles are introduced into standpipe 64 having a control valve 65 at its lower end. Fluidizing or aerating gas such as steam or fuel gas is introduced from main supply line 66 controlled by valve 68 into manifold 74 leading to a plurality of taps or aerating lines arranged along the length of the standpipe 64. These aerating lines are indicated starting at the top as lines 76, 78, 82, 84, 86 and 88. Each of the taps or fluidizing lines has a fixed restriction orifice diagrammatically shown at 92. With fluid coke as above defined, the density of the fluidized mixture passing down through standpipe 64 is between about 30 and 60 lbs. per cubic foot.

In a standpipe of considerable length, the fluidized solids as they pass downwardly through the standpipe are under increased pressure which compresses the gas between the solid particles. In order to maintain proper aeration, it is necessary to compensate for the compression of the gas as the dense fluidized mixture passes down through the lower portions of the standpipe so that it is necessary to introduce aerating gas through the taps or lines 76 to 88. The hot reheated solid coke particles leaving the bottom of the standpipe 64 are picked up by steam or similar inert gas introduced through line 94 to form a dilute suspension which is passed through upflow line or riser 96 into the upper portion of reactor 10 but preferably below the level 14 of the dense fluidized bed 12. Preferably the reheated solid coke particles are introduced into the dense fluidized bed of particles in the reactor 10 on the side opposite to that where the residual oil feed is introduced through lines 27, 28, 29, 30 and 31.

The upflowing suspension in riser 96 has a density between about 1 and 20 pounds per cubic foot. The vapors passing upwardly through the dense fluidized bed 12 are cracked and the cracked products containing entrained solids pass into the dilute or disperse phase 16 in the reaction vessel 10. The vaporous cracked products are then passed through cyclone separator 100 having an inlet 102 and the separated solid particles are returned below the level 14 of the dense fluidized bed 12 through dipleg 104. Cracked vaporous products are taken overhead through line 106 and are preferably treated in any conventional manner to separate desired products.

Arranged along the transfer line or vertical riser 96 is a static head or riser density meter 108 provided with a top tube or pipe 112 communicating with the riser 96 at a level above the meter means 108 and having a bottom tube or pipe 114 communicating with the riser 96 at a level below the metering means 108. The distance between lines 112 and 114 on riser 96 is indicated as 116 and is about 5 to 30 feet and tube 112 is about 5 to 15 feet below the top outlet or riser 96. The metering means 108 is used to measure differential pressure across the distance 116 in riser 96 and may be selected from any of a number of standard instruments such as the Foxboro $dP$ cell. The metering means 108 is attached by line 122 to a power source diagrammatically shown at 124 which in turn is connected to control valve 68 by line 126. Control valve 68 controls the amount of aeration gas supplied from line 66 to manifold 74.

With the risers 48 and 96 operating at a constant superficial gas velocity, there is a certain solids circulation rate between the vessels 10 and 16. There is a certain pressure drop across riser 96 from pipe or line 114 to upper pipe or line 112 and the apparatus or system is set up to supply correct amounts of fluidizing gas to the standpipe 64. Now, if it is desired to change the solids circulation rate to change process conditions and if the circulation rate of solids is increased, the pressure build-up in the standpipe 64 will fall off because the proper amount of aeration gas or fluidizing gas is not being supplied to the solids in the standpipe 64. As a result the differential pressure drop across the slide valve 65 would fall off and the unit would not be in good control.

However, with the present invention this situation is automatically prevented by automatically increasing the aeration gas to the standpipe 64 to the proper amount for this higher solids rate. As the solids circulation rate increases, the measured riser density increases and the pressure drop in riser 96 from pipe or line 114 to 112 is increased. By suitable standard instrumentation as shown at 108 and the associated parts, the increase in density operates the control valve 68 in the fluidizing or aeration gas supply line 66 to the standpipe 64 thereby increasing the aeration gas pressure and by increasing this pressure the aeration gas to each of the taps or lines 76 to 88 inclusive is increased.

With the static head or riser density meter 108 set for one pressure differential, the present invention will automatically compensate for any changes in the circulation rate which occur for any reason during the operation of the process.

While the metering device 108 and associated parts are shown in connection with only one standpipe and one riser it is to be understood that a similar arrangement can be supplied to the other standpipe 17' and the other riser 48, if desired.

It has been found that standpipe operation is obtained when the added aeration or fluidizing gas is very close to the amount required to just compensate for the compression of the gas as the mixture moves down in the standpipe. Thus for a given system, the amount of fluidizing gas required at each fluidizing line or tap 76 to 88, inclusive, is directly proportional to the solids circulation rate or rate of aerating gas addition, S. C. F. M. (standard cubic feet per minute)$=S=K_1G$ where $K_1$ is a constant and G is the rate of solids circulation in pounds per second per square foot of standpipe horizontal cross sectional area.

Then as the rate of solids circulation is varied to control temperature, solids to oil ratio or some similar process variable, the aeration or fluidizing gas rate must be changed in order to obtain best standpipe performance.

In the vast majority of cases the required fluidizing gas is introduced through fixed restriction orifices and in these cases the rate of fluidizing gas addition (S. C. F. M.) or (S) is directly proportional to the pressure (P) of the fluidizing gas on the upstream side of the orifice or $$S=K_2P$$

From the above equation it is apparent that it is desirable to control the fluidizing gas pressure in direct proportion to the solids circulation rate for the best standpipe performance. This is readily and easily accomplished by using the static head or riser density meter 108 on the riser 96 which the standpipe 64 feeds. The pressure drop ($dP$) on this meter 108 is substantially proportional to the actual solids circulation rate when, as is the usual case, the superficial gas velocity in the riser 96 is kept substantially constant or $$dP=K_3G$$

Thus, this pressure drop ($dP$) can be used to control the pressure on the aerating gas in direct proportion to the solids rate by standard instrumentation and with this invention the best performance of the standpipe is simply and automatically obtained and maintained at varying solids circulation rates.

In a specific apparatus used for coking at about 950° F. with the heater 17 at a temperature of about 1125° F. and with the coke having a particle size between about 50 and 500 microns and where the length of the standpipe 64 from grid 52 to valve 65 is about 60 feet high and the standpipe is about 2.25 ft. in diameter there are twelve aeration or fluidizing taps or lines 76 etc. provided and the taps are spaced at about 5 feet intervals. The pressure at the top of the stand pipe 64 is about 10 p. s. i. g. and the pressure at the bottom of the standpipe above the slide valve 65 is about 27 p. s. i. g. In this specific case the solids flow rate is selected to be about 100 lbs. per second per square foot of standpipe horizontal cross sectional area. For simplicity the drawing shows only 6 aeration taps 76 to 88 inclusive but for this specific example twelve taps are used. For proper aeration of the fluidized solids in the standpipe 64, the aeration or fluidizing gas should be added in equal amounts at each of the twelve aeration taps. However, as above pointed out the gas in the fluidized mixture, as the mixture flows down the standpipe, becomes compressed and also the pressure becomes greater toward the lower end of the standpipe 64 so that aeration gas must be introduced along the standpipe 64 to compensate for this compression. The fluidizing lines 76 etc. are each about 2 inches in diameter and the restriction orifices 92 are each about 1/16 inch in diameter. The proper rate of aerating gas to be added to standpipe 64 can be calculated from the relation (1)     S. C. F. M. gas to be added$=K_1G$ where $K_1$ is a constant depending on the solid being used, the distance between aeration taps, the standpipe cross sectional area, and the temperature, and G is the solids flow rate in pounds per second per square foot of standpipe horizontal cross section area. Thus for a given case everything is constant except G which must be changed from time to time as the process operating conditions are changed. For this example $K_1=0.075$ which can be calculated from the following equation.

$$K_1=\frac{14.7\ ALP_P}{T}\left(\frac{1}{P_B}-\frac{1}{P_A}\right)$$

where $A=$standpipe cross sectional area in square feet
$L=$distance between aeration taps in feet
$T=$operating temperature in ° Rankine
$P_B=$solids bulk density, lbs./cu. ft.
$P_P=$theoretical standpipe pressure buildup (about 80% of value of $P_B$) lbs./cu. ft.
$P_A=$true particle density lb./cu. ft.

Solving for $K_1$ where the standpipe is 4 square feet in cross ssectional area, the distance between taps 76 and 78 etc. is 5 feet, the temperature is 1560° Rankine, $P_B$ is 50 lb./cu. ft., $P_P=40$ lb./cu. ft. and $P_A=100$ lb./cu. ft. we have $$K_1 = \frac{14.7 \; ALP_P}{T}\left(\frac{1}{P_B} - \frac{1}{P_A}\right)$$

$$K_1 = \frac{(14.7)(4)(5)(40)}{1560}\left(\frac{1}{50} - \frac{1}{100}\right)$$

$$K_1 = 0.075$$

Initially the S. C. F. M. added to each line 76, 78 etc. equals 100 (0.075) =7.5. To accomplish this, normally high pressure steam is passed through restriction orifices 92 and with such a fixed orifice the flow through the orifice equals (2) $\qquad$ S. C. F. M. $=K_2P_1$ where $K_2$ is a constant depending on the aeration gas used, the temperature and the size of the orifice. $P_1$ is the stream pressure entering the orifice, or the upstream pressure. $P_2$ is the down stream pressure and for the restriction orifice selected $P_1$ equals or is greater than $2P_2$.

Here a standard formula is used. See for example Perry's "Chemical Engineers Handbook," on page 709 where the determination of a constant like $K_2$ is discussed. For this example the upstream steam pressure $P_1=100$ p. s. i. a. (pounds per square inch absolute), the orifice diameter is 0.074 inch, from which $K_2$ is calculated to be 0.075. Thus, for each aeration tap 100(0.075=7.5 S. C. F. M., which is the desired rate calculated from Equation 1.

In the riser 96 sufficient gas or vapors are added through line 94 so that the measured density in the riser is 10 lbs. per cubic foot and this is the density mesured between pipe lines 114 and 112 on the differential pressure measuring means 108. For the flow upward through the riser 96 the pressure at 114 ($P_3$) is greater than the pressure at 112 ($P_4$) and the density is $$D = \frac{(P_3-P_4)144}{h} \text{ lbs. per cubic foot}$$

Line 112 is 5 feet below the top outlet of riser 96 and the distance between lines 114 and 112 is 20 feet.

In this equation $P_3$ and $P_4$ are measured in p. s. i. g. and the height "$h$" between tap 114 and tap 112 is measured in feet.

With the riser operating at a constant superficial gas velocity, the density D measured in the riser 96 is equal to (3) $\qquad D = K_3G$ where $K_3$ is a constant depending on riser area, standpipe area, temperature, riser gas rate and type of riser gas used and G is the solids circulation rate in the standpipe as before. The constant $K_3$ can be obtained experimentally and for this case $K_3=0.1$.

To summarize, initially the following conditions prevail.

$G=100$ lbs. per second per square foot
$P_1=100$ p. s. i. a
$D=10$
$K_1=0.075$
$K_2=0.075$
$K_3=0.1$ Now it is desired to change the solids circulation rate to change process conditions and it is desired to go to $G=120$ lbs. per second per square foot and when this is done the pressure build up in the standpipe will fall off due to the increased circulation rate because the proper amount of aeration gas is not being supplied by the aeration taps. As a result the differential pressure drop across the slide valve 65 at the bottom of the standpipe 64 will fall off and the unit will not be in good control. With this invention this situation is automatically prevented by automatically increasing the aeration gas to the standpipe to the proper amount for this higher solids circulation rate.

As the solids circulation rate G increases from 100 to 120 lbs. per second per square foot, the measured riser density increases according to the equation $$D = K_3G = (0.1)(120) = 12 \text{ lbs./cu. ft.}$$

With this increased density there will be a greater pressure drop measured by the pressure drop or riser density meter 108 and the differential pressure recorder 108 actuates the operating means 124 through line 122 which in turn actuates valve 68 in aerating gas supply line 66 through line 126 to open the control valve 68 to increase the aerating gas pressure in line 66 from 100 to 120 p. s. i. a. Then by Equation 2 the areating gas to each aerating gas line or tap 76 to 88 inclusive is increased from 7.5 S. C. F. M. to

S. C. F. M. $=K_2P_1=0.075 \; (120)=9.0$

Referring back to Equation 1, the desired rate of aeration gas for the higher solids flow rate therefore equals S. C. F. M. $=K_1G=0.075 \; (120)=9.0$ and that is exactly what the system has automatically supplied.

What is claimed is:

1. In a method for circulating finely divided solids between vessels by means of standpipes and risers and wherein proper fluidity of the finely divided solids in the standpipe is necessary to build up pressure for circulating the solids, the improvement which comprises measuring the density of the upflowing fluidized solids in one riser and controlling the amount of aerating gas introduced into fluidized solids flowing down through the standpipe directly associated with and feeding solids to said one riser in response to changes in density of the upflowing fluidized solids in said one riser.

2. In a system for circulating finely divided solids between vessels by means of standpipes and risers wherein fluidizing gas is introduced at a plurality of vertically spaced places along the length of one of said standpipes and into the fluidized solids flowing down through said standpipe to maintain the solids in fluidized condition and the density of the upflowing solids suspension in the risers is substantially directly proportional to the rate of solids circulation in said system, the improvement which comprises measuring the density of the upflowing solids suspension in one of said risers and controlling the introduction of fluidizing gas to introduce the proper amount of fluidizing gas at each place along the standpipe directly associated with and feeding solids to said one riser in response to the density of said upflowing solids suspension.

3. An apparatus including in combination two vessels adapted to contain fluidized beds of finely divided solids, standpipes and risers for circulaitng finely divided solids between said vessels, a plurality of aeration lines arranged in spaced relation along the length of one of said standpipes, manifold means for supplying aeration gas to each of said aeration lines, a control valve for said manifold means, a differential pressure indicator arranged along the riser associated with said last-mentioned standpipe and means associated with said differential pressure indicator and said control valve whereby variation in said differential pressure indicator readings automatically controls the amount of fluidizing gas being introduced into said aeration lines to maintain proper aeration of the finely divided solids in said standpipe.

4. An apparatus according to claim 3 wherein each fluidizing line is provided with a fixed orifice of the same size and said differential pressure indicator actuates said control valve to increase the pressure of the aeration gas going to said manifold means when the solids circulation rate is increased.

References Cited in the file of this patent

UNITED STATES PATENTS

| | | |
|---|---|---|
| 2,311,564 | Munday | Feb. 16, 1943 |
| 2,684,873 | Berg | July 27, 1954 |
| 2,739,845 | Berg | Mar. 27, 1956 |
| 2,746,810 | May | May 22, 1956 |